US012657132B2

(12) United States Patent
Shanbhogue et al.

(10) Patent No.: US 12,657,132 B2
(45) Date of Patent: Jun. 16, 2026

(54) MEMORY BANDWIDTH CONTROL IN A CORE

(71) Applicant: Intel Corporation, Santa Clara, CA (US)

(72) Inventors: Vedvyas Shanbhogue, Austin, TX (US); Krishnakumar Ganapathy, Bee Cave, TX (US); Venkateswara Madduri, Austin, TX (US); James Allen, Austin, TX (US); James Coleman, Mesa, AZ (US); Stephen Robinson, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 17/214,851

(22) Filed: Mar. 27, 2021

(65) Prior Publication Data

US 2022/0309005 A1 Sep. 29, 2022

(51) Int. Cl.
G06F 12/0897 (2016.01)
G06F 3/06 (2006.01)
G06F 9/50 (2006.01)

(52) U.S. Cl.
CPC ........ G06F 12/0897 (2013.01); G06F 3/0604 (2013.01); G06F 3/0631 (2013.01); G06F 3/0676 (2013.01); G06F 3/0677 (2013.01); G06F 3/0679 (2013.01); G06F 2212/60 (2013.01)

(58) Field of Classification Search
CPC ............. G06F 12/0897; G06F 2212/60; G06F 3/0604; G06F 3/0631; G06F 3/0676; G06F 3/0677; G06F 3/0679; G06F 9/5016; G06F 13/1678; G06F 9/5027; G06F 13/4221

USPC .......................................................... 711/118
See application file for complete search history.

(56) References Cited

U.S. PATENT DOCUMENTS

| | | | | |
|---|---|---|---|---|
| 9,398,462 | B1* | 7/2016 | Delker | ................... H04W 4/60 |
| 10,339,023 | B2* | 7/2019 | Wang | .................... G06F 1/3206 |
| 2008/0075101 | A1* | 3/2008 | Illikkal | ................. G06F 9/5038 |
| | | | | 370/412 |
| 2016/0253264 | A1* | 9/2016 | Bose | ................... G06F 11/3024 |
| | | | | 711/137 |
| 2017/0147249 | A1 | 5/2017 | Hower et al. | |
| 2018/0373633 | A1* | 12/2018 | Herdrich | ............. G06F 12/0811 |
| 2019/0007747 | A1* | 1/2019 | Bernat | ............. H04N 21/64738 |
| 2019/0179757 | A1* | 6/2019 | Walker | ................ G06F 11/3419 |
| 2019/0354406 | A1* | 11/2019 | Ganguli | ................ G06F 9/5011 |

(Continued)

OTHER PUBLICATIONS

European Search Report and Search Opinion, EP App. No. 22158136.6, Jul. 12, 2022, 9 pages.
Office Action, EP App. No. 22158136.6, Jul. 25, 2025, 9 pages.

*Primary Examiner* — Hashem Farrokh
(74) *Attorney, Agent, or Firm* — Nicholson De Vos Webster & Elliott LLP

(57) ABSTRACT

Techniques for controlling bandwidth in a core are described. An exemplary core includes a memory bandwidth monitor per thread local to the core, each thread's local bandwidth monitor to at least allocate bandwidth for memory requests originating from the thread according to a class of service level stored in a field of quality of service (QoS) model-specific register (MSR), the class of service level pointed to by a class of service field in a platform quality of service MSR; and execution resources to support execution of at least one thread of the core.

20 Claims, 16 Drawing Sheets

(56) References Cited

U.S. PATENT DOCUMENTS

| 2020/0125411 | A1 | 4/2020 | Goodman et al. |
| 2020/0201671 | A1 | 6/2020 | Samih et al. |
| 2020/0210332 | A1 | 7/2020 | Steiner et al. |

* cited by examiner

| IA32_PQR_ASSOC 201 | | | |
|---|---|---|---|
| [63:(P+1)] | [P:48] | [47:(M+1)] | [M:32] | [31:(N+1)] | [N:0] |
| RSVD | RSVD | RSVD | CLOS | RSVD | RSVD |

INDEX

| IA32_QOS_CORE_BW_THRTL_N 203 | | | | | | | |
|---|---|---|---|---|---|---|---|
| [63:56] | [55:48] | [47:40] | [39:32] | [31:24] | [23:16] | [15:8] | [7:0] |
| CLOS[7].LEVEL | CLOS[6].LEVEL | CLOS[5].LEVEL | CLOS[4].LEVEL | CLOS[3].LEVEL | CLOS[2].LEVEL | CLOS[1].LEVEL | CLOS[0].LEVEL |

FIG. 2

| LEVEL | REQUEST RATE CONTROL ONTO INTERCONNECT | PER BANK XQ ENTRIES THRESHOLD VALUES | PER BANK LQ ENTRIES THRESHOLD VALUE |
|---|---|---|---|
| 0 | 1 | 16 | 6 |
| 1 | 3 | 16 | 6 |
| 2 | 4 | 16 | 6 |
| 3 | 8 | 16 | 6 |
| 4 | 16 | 16 | 6 |
| 5 | 32 | 16 | 6 |
| 6 | 64 | 8 | 4 |
| 7 | 96 | 8 | 4 |
| 8 | 128 | 8 | 4 |
| 9 | 192 | 8 | 4 |
| 10 | 256 | 8 | 4 |
| 11 | 320 | 4 | 2 |
| 12 | 512 | 4 | 2 |
| 13 | 768 | 4 | 2 |
| 14 | 1024 | 4 | 2 |
| 15 | 2048 | 4 | 2 |

MAPPING OF RESOURCES IN CONTROL REGISTERS 303

T0 CLOS    T1 CLOS

T2 CLOS    T3 CLOS

| MSRS | FIELD VALUES |
|---|---|
| IA32_QOS_CORE_BW_THRTL_0 | VALID RANGE 0 TO 7 |
| ... | ...... |
| IA32_QOS_CORE_BW_THRTL_1 | VALID RANGE 8 TO 15 |
| OTHERS | |

SOFTWARE-EXPOSED 301

FIG. 3

WRITE PQR FOR A FIRST THREAD 401

ADJUST BANDWIDTH AND/OR QUEUES BASED ON THROTTLE VALUE FOR THE FIRST THREAD 403

SEND MEMORY REQUESTS (AND MONITOR WITH A BANDWIDTH MONITOR) 405

PROVIDE FEEDBACK TO THE CORE 407

CONTEXT SWITCH (WRITE PQR FOR A SECOND THREAD) 409

ADJUST BANDWIDTH AND/OR QUEUES BASED ON THROTTLE VALUE FOR THE SECOND THREAD 411

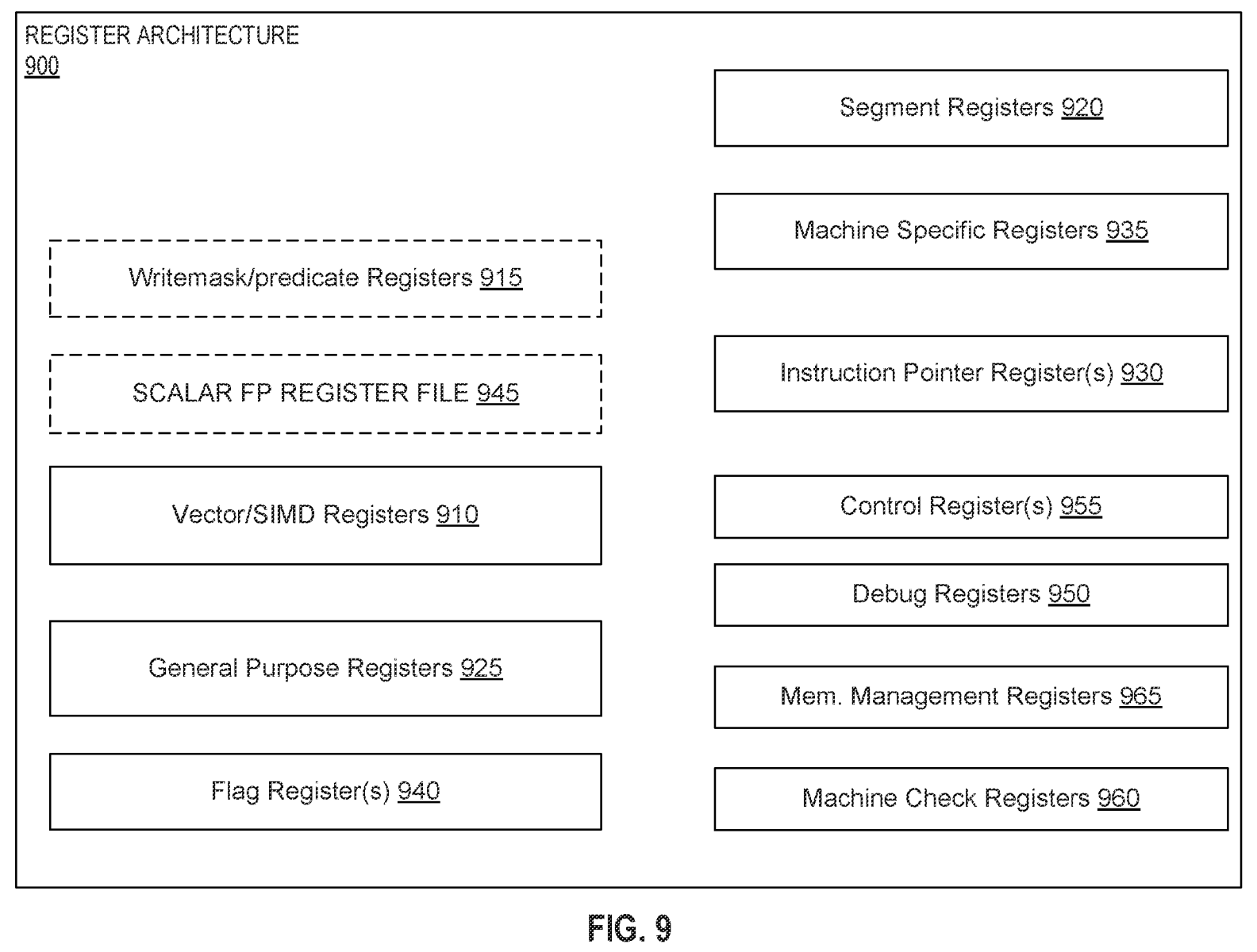

REGISTER ARCHITECTURE
900

Segment Registers 920

Machine Specific Registers 935

Instruction Pointer Register(s) 930

Control Register(s) 955

Debug Registers 950

Mem. Management Registers 965

Machine Check Registers 960

Writemask/predicate Registers 915

SCALAR FP REGISTER FILE 945

Vector/SIMD Registers 910

General Purpose Registers 925

Flag Register(s) 940

FIG. 9

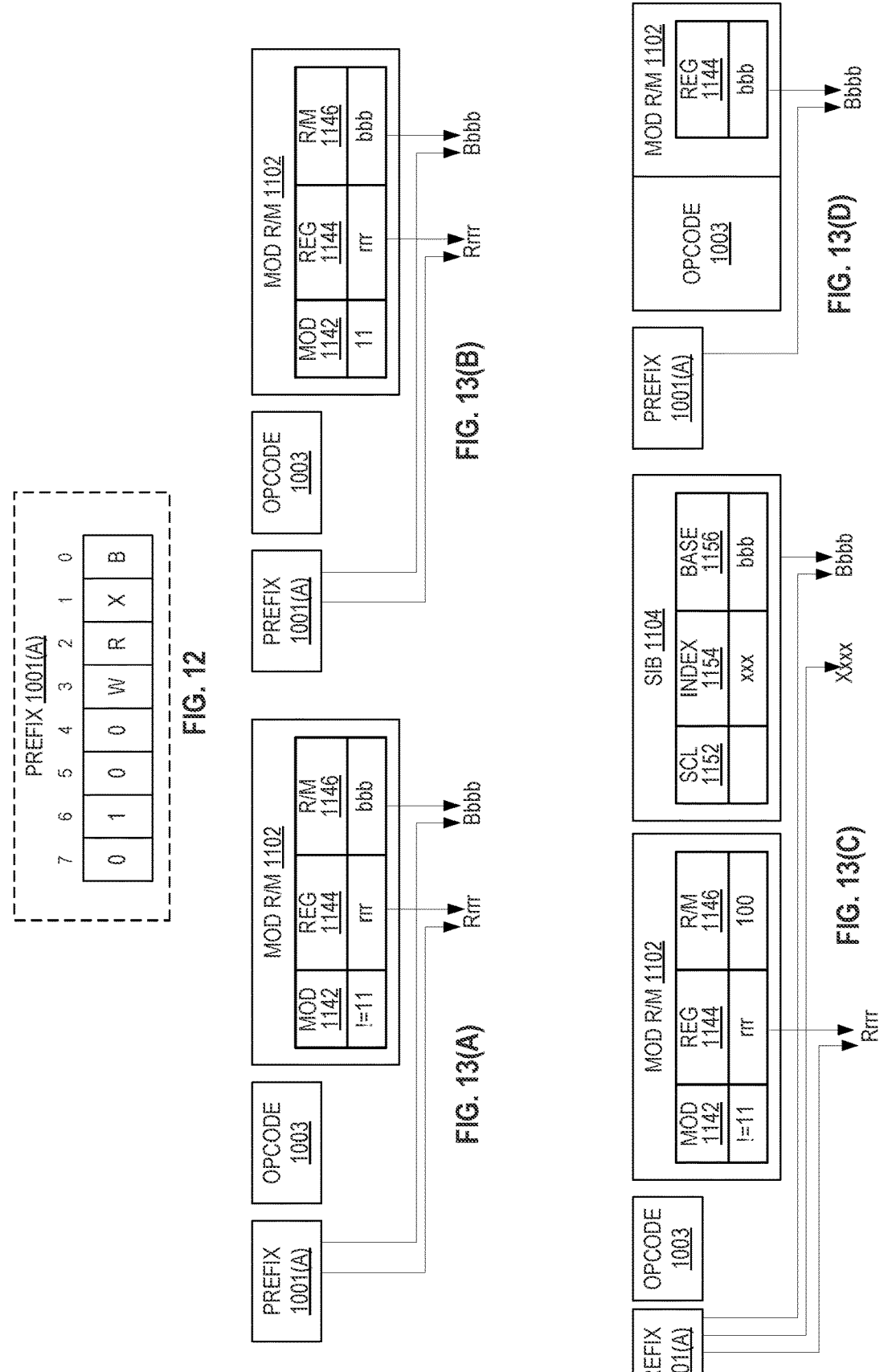

MEMORY BANDWIDTH CONTROL IN A CORE

FIELD OF INVENTION

The field of invention relates generally to computer architecture, and, more specifically, to allocating shared resources.

BACKGROUND

Processor cores in multicore processors may use shared system resources such as caches (e.g., a last level cache or LLC), system memory, input/output (I/O) devices, and interconnects. The quality of service provided to applications may be degraded and/or unpredictable due to contention for these or other shared resources.

Some processors include technologies, such as Resource Director Technology (RDT) from Intel Corporation, that enable visibility into and/or control over how shared resources such as LLC and memory bandwidth are being used by different applications executing on the processor. For example, such technologies may provide for system software to allocate different amounts of a resource to different applications and/or monitor resource usage and temporarily prevent access to a resource by a low priority application that exceeds a quota.

BRIEF DESCRIPTION OF DRAWINGS

Various embodiments in accordance with the present disclosure will be described with reference to the drawings, in which:

FIG. 2 illustrates embodiments of the IA32_PQR_ASSOC MSR and IA32_Qos_Core_BW_Thrtl_N MSRs.

FIG. 3 illustrates examples of the mapping of software exposed MSRs to microarchitectural resources.

FIG. 9 is a block diagram of a register architecture 900 according to some embodiments.

FIG. 12 illustrates embodiments of a first prefix 1001(A).

FIGS. 13(A)-(D) illustrate embodiments of how the R, X, and B fields of the first prefix 1001(A) are used.

DETAILED DESCRIPTION

Figure 1:
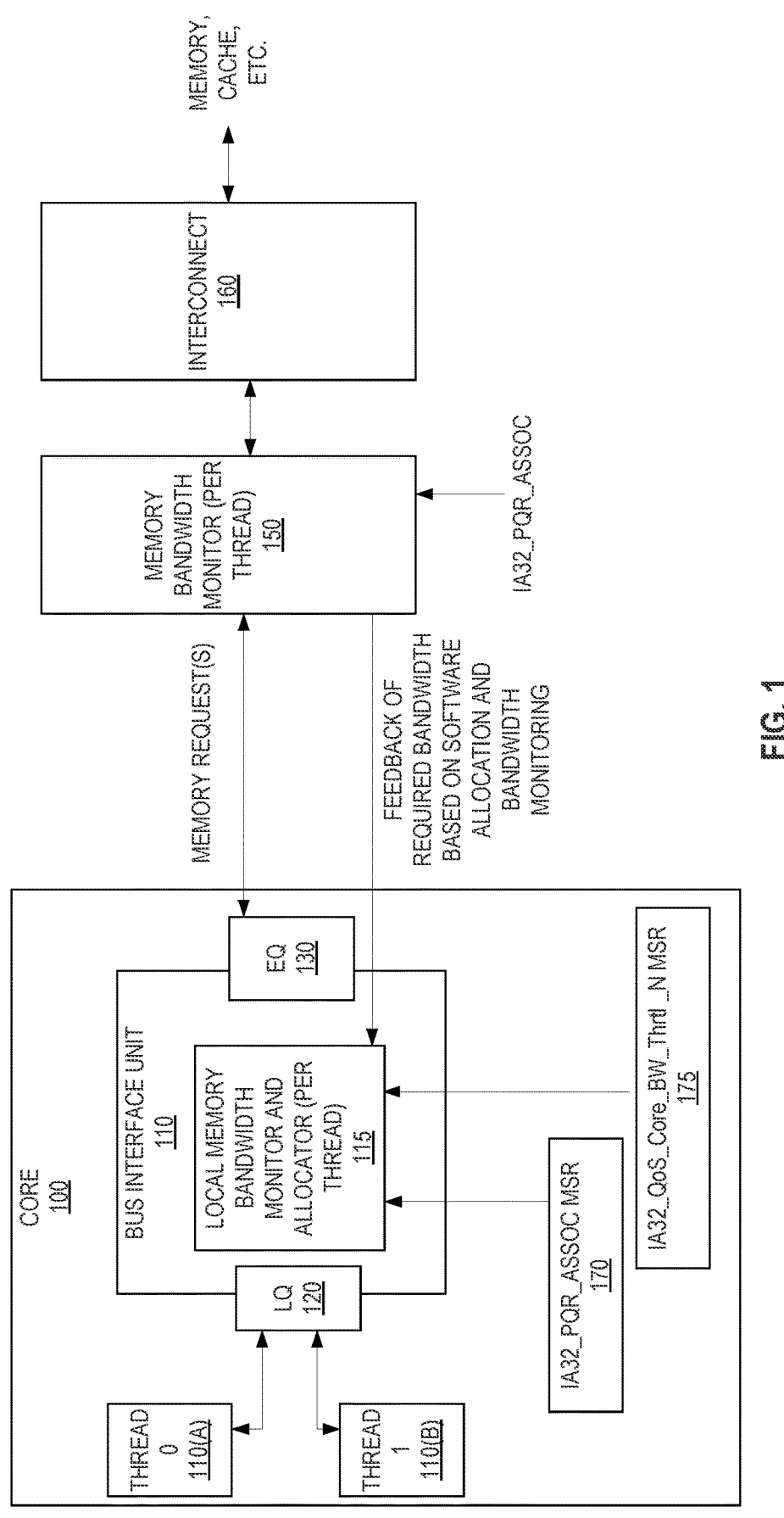
FIG. 1 illustrates a block diagram of a system in which per thread memory bandwidth is supported.

The present disclosure relates to methods, apparatus, systems, and non-transitory computer-readable storage media for adjusting memory bandwidth of a core.

In the following description, numerous specific details are set forth. However, it is understood that embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in this specification and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments of the invention, a "/" character between terms may mean that what is described may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

In this specification and its drawings, the term "thread" and/or a block labeled "thread" may mean and/or represent an application, software thread, process, virtual machine, container, etc. that may be executed, run, processed, created, created, assigned, etc. on, by, and/or to a core.

The term "core" may mean any processor or execution core, as described and/or illustrated in this specification and its drawings and/or as known in the art. The term "uncore" may mean any circuitry, logic, sub-systems, etc. (e.g., an integrated memory controller (iMC), power management unit, performance monitoring unit, system and/or I/O controllers, etc.) in/on a processor or system-on-chip (SoC) but not within a core, as described and/or illustrated in this specification and its drawings and/or as known in the art (e.g., by the name uncore, system agent, etc.). However, use of the terms core and uncore in in the description and figures does not limit the location of any circuitry, hardware, structure, etc., as the location of circuitry, hardware, structure, etc. may vary in various embodiments. For example, model specific registers (MSRs) (as defined below) 104 may represent one or more registers, one or more of which may be in a core, one or more of which may be in an uncore, etc.

The term "quality of service" (or QoS) may be used to mean or include any measure of quality of service mentioned in this specification and/or known in the art, to an individual thread, group of threads (including all threads), type of thread(s), including measures of and/or related to performance, predictability, etc. The term "memory bandwidth allocation" (or MBA) may be used to refer to a technique or the use of a technique to allocate memory bandwidth and/or a quantity of memory bandwidth allocated, provided available, etc. or to be allocated, etc.

Embodiments of the invention may be used to allocate shared resources, such as caches and memory, in computer systems. For example, embodiments may perform MBA with improved behavior and accuracy and may use MBA to provide increased throughput and greater efficiency, compared to previously known approaches, and/or may provide for efficient sharing of a cache. The use of embodiments may reduce "noisy neighbor" problems in which QoS for a thread is adversely and sometimes unacceptably affected by a different thread.

In these and/in other embodiments, throttling granularity as described above may be provided for configuration purposes and may be applied using a control mechanism that approximates the granularity, based on time, number of credits, etc. In embodiments, rate limit settings (e.g., throttling levels, delay values) may be applied to threads or cores through configuration or MSRs that may be configured by system software to map threads or cores to a class of service (CLOS) and a CLOS to a rate limit setting. For example, throttling may be applied through a first MSR (e.g., IA32_PQR_ASSOC—where PQR stands for platform quality of service) that maps a thread to a CLOS and through a second MSR (e.g., IA32_L2_QoS_Ext_Thrtl_n) that maps a CLOS to a delay value.

Embodiments may provide for mapping a thread to any number of CLOS (e.g., 8, 15, etc.), differentiated with a CLOS identifier (CLOSID). For example, one or more control registers (e.g., programmable by a basic input/output system (BIOS) for power-up calibration and/or system software) may include a number of bits (e.g., 4, 8) to specify one of a corresponding number of delay values (e.g., MBEDelay). For example, four 32-bit control register may be provided to accommodate 16 CLOSIDs and 8-bit MBEDelay values. In embodiments, a default, minimal delay value may be used as an unthrottled delay and programmed by microcode.

This may not allow for a capability to directly cap the maximum bandwidth from each logical processor. Further, the bandwidth from each logical processor can be bursty which affects the latency while still meeting external bandwidth requirement.

Embodiments may provide better QoS than existing technologies in which the pace of allocation decisions and adjustments may be limited by the pace at which system software operates, while remaining compatible (e.g., architecturally) with existing technologies. Embodiments may do so, for example, with dynamic hardware controllers, internal to core or per-core circuitry, that may react to changing bandwidth conditions faster (e.g., at the microsecond level) than approaches that use strict bandwidth control mechanisms. In embodiments, the use of dynamic hardware control of MBA may allow software that primarily uses an LLC to experience increased throughput for a given throttling level (as described below) and due to fine-grained interleaving of high and low priority requests from threads, may lead to an increase in system throughput. In embodiments, hardware may provide dynamic monitoring of bandwidth and fine-grained calibration of control that may result in greater throughput and application performance, particularly for an application with varying levels of LLC use that may cause bandwidth demand/use to exceed a threshold intermittently, compared to previous approaches that use a control mechanism based on average bandwidth use/demand over greater periods, with coarser calibrations.

FIG. 1 illustrates a block diagram of a system in which per thread memory bandwidth is supported. As shown, a core 100 includes two threads (thread 0 110(A) and thread 110(B)) which may be memory bandwidth limited. Note that the system may include any number of cores of any architecture (e.g., an embodiment may include a heterogeneous processor or system having cores of different architectures), with any number of threads per core (e.g., an embodiment may include a first core with and/or supporting a first number of threads and a second core with and/or supporting a second (which may be different from the first) number of threads.

In some embodiments, the memory that is to be bandwidth limited is a cache (e.g., an LLC or a level 3 (L3) cache) and/or memory bandwidth. In embodiments, the shared cache may be fabricated on the same substrate (e.g., semiconductor chip or die, SoC, etc.) and the memory may be on one or more separate substrates and/or in one or more packages separate from the package containing the shared cache; however, any arrangement and/or integration of shared resources (e.g., cache and/or memory) and users (e.g., cores and/or threads) in/on a substrate, chiplet, multichip module, package, etc. is possible in various embodiments. In some embodiments, the memory that is to be bandwidth limited is main memory.

The core 100 includes at least two types of MSRS. As noted above, for each logical processor, a MSR 170 (e.g., the IA32_PQR_ASSOC MSR) specifies an active class of service (CLOS). Software can control per-core memory bandwidth by programming the MBA delay values (percentage of throttling) into a quality of service MSR (e.g., IA32_L2_QoS_Ext_BW_Thrtl_CLOS(n)_MSR for traffic to the external memory) as noted.

Each logical processor gets a memory bandwidth target signaled through a Memory Bandwidth Enforcement (MBE) level from the memory bandwidth monitor (per thread) 150 which ranges from 0-15 (0 being unthrottled, 15 being most throttled). The MBE level is based on the delay value programmed by software (as a percentage of throttling) in the IA32_L2_QoS_Ext_BW_Thrtl_CLOS(n)_MSR. The memory bandwidth monitor (per thread) 150 is responsible for adapting MBE level to account for memory traffic, LLC hit/miss rate, etc. and takes in the CLOS from IA32_PQR_ASSOC MSR.

A quality of service bandwidth per thread MSR (e.g., IA32_Qos_Core_BW_Thrtl_N where N is the thread number) 175 includes fields (in some embodiments, 8-bit fields, however other sized fields may be used such as 4-bit, 16-bit, etc.) that specify a throttle level for a given CLOS. This MSR 175 enables software to communicate the memory bandwidth QoS requirements of an application running on the logical processor. The programmed value is used by the logical processor to manage the underlying microarchitectural resource such as queue sizes and service rate control. The thread scope enables migration of a virtual machine in a virtualized environment.

The CLOS field of the IA32_PQR_ASSOC MSR 170 is used to index into the MSRs 175 which provide a memory bandwidth level. This level is used by each of the logical processors to control the bandwidth onto an interconnect. The reset value of the CLOS[i].Level=0 indicates unthrottled bandwidth. This field can be programmed from 0 to 15 in some embodiments. Any values outside this range will cause a general protection fault. A higher value of CLOS[i].Level means more bandwidth throttling and lower number indicates lesser throttling.

When the IA32_QoS_Core_BW_Thrtl_N MSR 175 has a throttled value, the resolved MBE level as seen by a core is:

Maximum (IA32_Qos_Core_BW_Thrtl_N programmed CLOS.Level, uncore MBE level)

A local memory bandwidth monitor and/or allocator (per thread) 115 of a bus interface unit 110 handles the bandwidth throttling for a thread (e.g., a request rate over an interconnect 160—which may be an on-die interconnect or an interconnect to couple to devices off die). The local memory bandwidth monitor and/or allocator (per thread) 115 also dictates a number of entries in a local queue 120 (which interacts with threads) and/or an external queue 130 (which interacts with the memory bandwidth monitor (per thread) 150, interconnect 160, and/or memory, cache, etc. Note that bandwidth throttling may be linear or non-linear.

Note that monitors 115 and 150 are combined in some embodiments. That is, in some embodiments, the existence of the local bandwidth monitor 150 is orthogonal to existence of the bandwidth monitor 150 (i.e., the system can function with or without monitor 150). When 150 exists the lower of the bandwidth level determined by monitor 115 and monitor 150 will be effective. When monitor 115 is present and monitor 150 is not present then monitor 115 is the sole bandwidth controller.

In embodiments, rate limiters may limit use of a resource (e.g., memory bandwidth) by a corresponding core and/or thread, for example by limiting access by the core/thread to the resource based on time, based on a crediting scheme, etc. In embodiments, a throttling technique may be used to restrict or prevent access during one or more first periods within a second (larger than the first) period, while allowing or providing access during the remainder of the second period. Embodiments may provide for various granularities at which access may be restricted/prevented, for example, embodiments may provide for a throttling granularity of 10% such that a rate limiter may perform throttling to reduce MBA to any of 90%, 80%, 70%, etc. of full capacity.

In embodiments, for example in embodiments in which cores are connected through a mesh interconnect on which messaging may be managed or controlled using a crediting scheme, the crediting scheme may be used to limit the rate at which cores are able to pass messages such as memory access requests toward a memory controller. In these and/or other embodiments, as may be true of any circuitry included in embodiments, circuitry that performs rate limiting may be integrated into or with other circuitry of a processor, such as circuitry in or at an interface between a core and a mesh that connects to an integrated memory controller (iMC) (e.g., indirectly through such interfaces associated with other cores) but be conceptually represented as a separate block in a drawing.

In some embodiments, at least one of the memory bandwidth monitor 150 and/or local memory bandwidth monitor 1115 includes a rate selector that may include hardware and/or software providing a monitoring capability (further described below) to determine whether its associated core/thread is overutilizing memory bandwidth and hardware and/or software providing a rate setting capability to set and adjust rate limits for cores/threads that are overusing bandwidth or consuming less than they are allocated. For example, if a measurement from the monitoring capability indicates that memory bandwidth demand is higher than a prescribed memory bandwidth demand, a first MBA rate setting may be selected, where the first MBA rate setting is limited and slower than a second MBA rate setting (e.g., unlimited, unthrottled), that may be otherwise selected and/or used.

In some embodiments, a rate selector may be part of a feedback loop that includes input to the rate selector from a point downstream of (i.e., further from the source than) the rate limiter. For example, a rate selector may receive input from and/or related to an interface between an LLC (e.g., L3 cache or L4 cache) and memory.

In some embodiments, a rate selector may include a hardware controller (as further described below) within and/or dedicated to a core, that receives information from a caching agent within and/or dedicated to the core. In embodiments, a rate selector may include a hardware controller that may be enabled/disabled (e.g., by programming an MSR such as MBA_CFG) such that the rate may be selected either by the hardware controller (as further described below) or by a software controller (e.g., based on a feedback loop as described below and as shown in FIG. 1). Use of the hardware controller may be desired for usages (e.g., datacenter) that may benefit from faster response (e.g., on the order of microseconds instead of hundreds of milliseconds or seconds that software may need for system-level sampling of thread resource monitoring identifiers (RMIDs)), and/or for any other reason. Use of the software controller may be desired for programming compatibility with previous techniques that did not include a hardware controller, for usages (e.g., internet-of-things devices) that might not benefit from hardware control (e.g., because they may need simple, deterministic bandwidth capping), and/or for any other reason.

In some embodiments, a per thread rate limiter receives an input from a rate selector and/or through a feedback loop that has determined that a corresponding thread is to be limited (and, in embodiments, a value of a limited rate to be applied). The determination may be made based on monitoring (or measuring, etc.) demand for and/or use of a shared resource (e.g., intra-die interconnect (IDI) or memory bandwidth) as described below and/or elsewhere in this specification.

For example, the core may be directed to constrain itself based on an uncore-defined (e.g., by a rate selector) per-thread number of IDI requests per a period of time. In or for the mid-level cache (MLC, e.g., L2 cache 121 or 122), time may be divided into constant-length windows. Throttle circuitry/logic (e.g., a rate limiter) in an MLC cluster may determine what microoperation (up) allocation throttle level will be applied for each thread, and throttle circuitry/logic (e.g., a uop allocator) in the out-of-order (000) cluster may apply that throttle.

FIG. 2 illustrates embodiments of the IA32_PQR_ASSOC MSR and IA32_Qos_Core_BW_Thrtl_N MSRs. As shown, one of the fields of the IA32_PQR_ASSOC MSR 201 is a CLOS value. This value services an index into IA32_QoS_Core_BW_Thrtl_N MSR 203. For example, if CLOS=4 in IA32_PQR_ASSOC MSR 201, then the CLOS [4] level field of IA32_QoS_Core_BW_Thrtl_N MSR 203 is indexed. The value that is stored in that field is used to map to one or more of a request rate and/or queue threshold(s).

FIG. 3 illustrates examples of the mapping of software exposed MSRs to microarchitectural resources. As shown, the software exposed MSRs 301 include the IA32_PQR_ASSOC MSR (shown here per logical) and the IA32_QoS_Core_BW_Thrtl_N registers (per thread) (note a logical processor may have multiple threads).

As shown, the CLOS from a IA32_PQR_ASSOC MSR provides an index into a CLOS field in the IA32_QoS_Core_BW_Thrtl_N MSRs. That CLOS field has a value from 0 to 15 which then maps to different levels of QoS. For example, if the CLOS field has a value of 4, the request is 16, the per bank external queue entries threshold value is 15, and the per bank local queue entries threshold value is 6.

In this example, IA32_QoS_Core_BW_Thrtl_0 corresponds to CLOS values 0-7 and IA32_QoS_Core_BW_Thrtl_1 corresponds to CLOS values 8-15.

The table below further shows exemplary mappings of the CLOS field level to request queue entries and bandwidth for linear characteristics.

| Level | Occupancy; external request queue entries | Bandwidth (Gb/s) |
|---|---|---|
| 0 | 94 | 46.20 |
| 1 | 89 | 43.31 |
| 2 | 83 | 40.60 |
| 3 | 78 | 38.07 |
| 4 | 73 | 35.69 |
| 5 | 69 | 33.46 |
| 6 | 64 | 31.37 |
| 7 | 60 | 29.41 |
| 8 | 57 | 27.57 |
| 9 | 53 | 25.84 |
| 10 | 50 | 24.23 |
| 11 | 47 | 22.72 |
| 12 | 44 | 21.30 |
| 13 | 41 | 19.96 |
| 14 | 39 | 18.72 |
| 15 | 36 | 17.55 |

The table below further shows exemplary mappings of the CLOS field level to request queue entries and bandwidth for non-linear characteristics.

| Level | Occupancy; external request queue entries | Bandwidth (Gb/s) |
|---|---|---|
| 0 | 94 | 46.20 |
| 1 | 94 | 30.80 |
| 2 | 94 | 23.10 |
| 3 | 94 | 11.55 |
| 4 | 76 | 4.67 |
| 5 | 76 | 2.33 |

-continued

| Level | Occupancy; external request queue entries | Bandwidth (Gb/s) |
|---|---|---|
| 6 | 76 | 1.17 |
| 7 | 76 | .78 |
| 8 | 76 | .58 |
| 9 | 36 | .18 |
| 10 | 36 | .14 |
| 11 | 36 | .11 |
| 12 | 36 | .07 |
| 13 | 36 | .05 |
| 14 | 36 | .03 |
| 15 | 36 | .02 |

In some embodiments, a number of supported Levels and CLOS for the logical processor are enumerated in a CPUID Leaf as follows:

| INITIAL EAX VALUE | | DESCRIPTION |
|---|---|---|
| 0X10 | MEMORY BANDWIDTH CONTROL IN THE CORE ENUMERATION SUB-LEAF (EAX = 0X10, ECX = RESID = 5) | |
| | EAX[7:0] | REPORTS THE MAXIMUM CORE THROTTLING LEVELS SUPPORTED BY THE CORE. 0XF SUPPORTS MAX THROTTLING LEVESL OF 15 |
| | EAX[11:8] | INDICATES THE SCOPE OF THE IA32_QOS_CORE_BW_ THRTL_NMSRS 0: INVALID 1: THREAD 2: CORE 3: MODULE [15:4]: RESERVED |
| | EAX[31:12] | RESERVED |
| | EBX[31:0] | RESERVED |
| | ECX[2:0] | RESERVED |
| | ECX[3] | REPORTS A RESPONSE OF BANDWIDTH CONTROL IS LINEAR WHEN SET TO 1 REPORTS A RESPONSE OF BANDWIDTH CONTROL IS NON-LINEAR WHEN SET TO 0 |
| | ECX[31:4] | RESERVED |
| | EDX[15:0] | HIGHEST CLOS NUMBER SUPPORTED (MINUS 1) 0XF SUPPORTS 16 CLOS |
| | EDX[31:16] | RESERVED |

Figure 4:
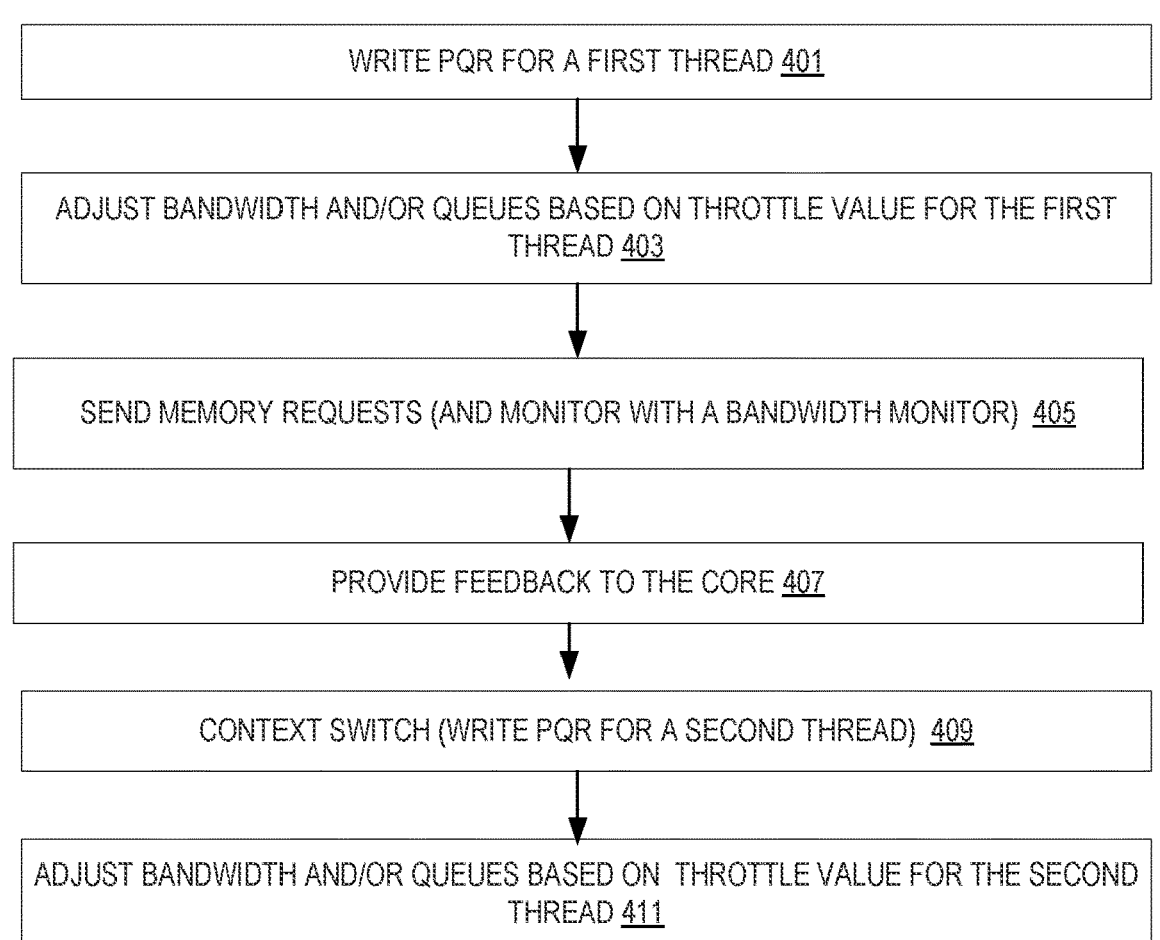
FIG. 4 illustrates an exemplary method flow that involves changing memory bandwidth in a core.

FIG. 4 illustrates an exemplary method flow that involves changing memory bandwidth in a core. At 401, software writes to a PQR MSR (e.g., IA32_PQR_ASSOC MSR) at least a CLOS value for a first software thread. For example, a write MSR (WRMSR) instruction may be used to write a CLOS value. This CLOS value is used to index a QoS MSR (e.g., IA32_QoS_Core_BW_Thrtl_N MSR) for the software thread to get a throttle value which is used to determine a bandwidth level, etc.

The bandwidth level and/or queues are updated for the first thread based on the stored throttle value at 403.

At 405, memory requests are sent (and monitored with a bandwidth monitor) from the core and responded to.

Additionally, feedback is provided to the core regarding required bandwidth for the thread based on software allocation and bandwidth monitoring at 407.

At 409 a context switch occurs wherein the first software thread is to be swapped for a second software thread. The context switch may involve storing state, etc., but includes writing to the PQR MSR a CLOS to be used for the second thread.

The bandwidth level and/or queues are updated for the second software thread based on the stored throttle value at 411.

The above embodiments may be embodied in several different types of architectures and systems, examples of which are detailed below.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 5:
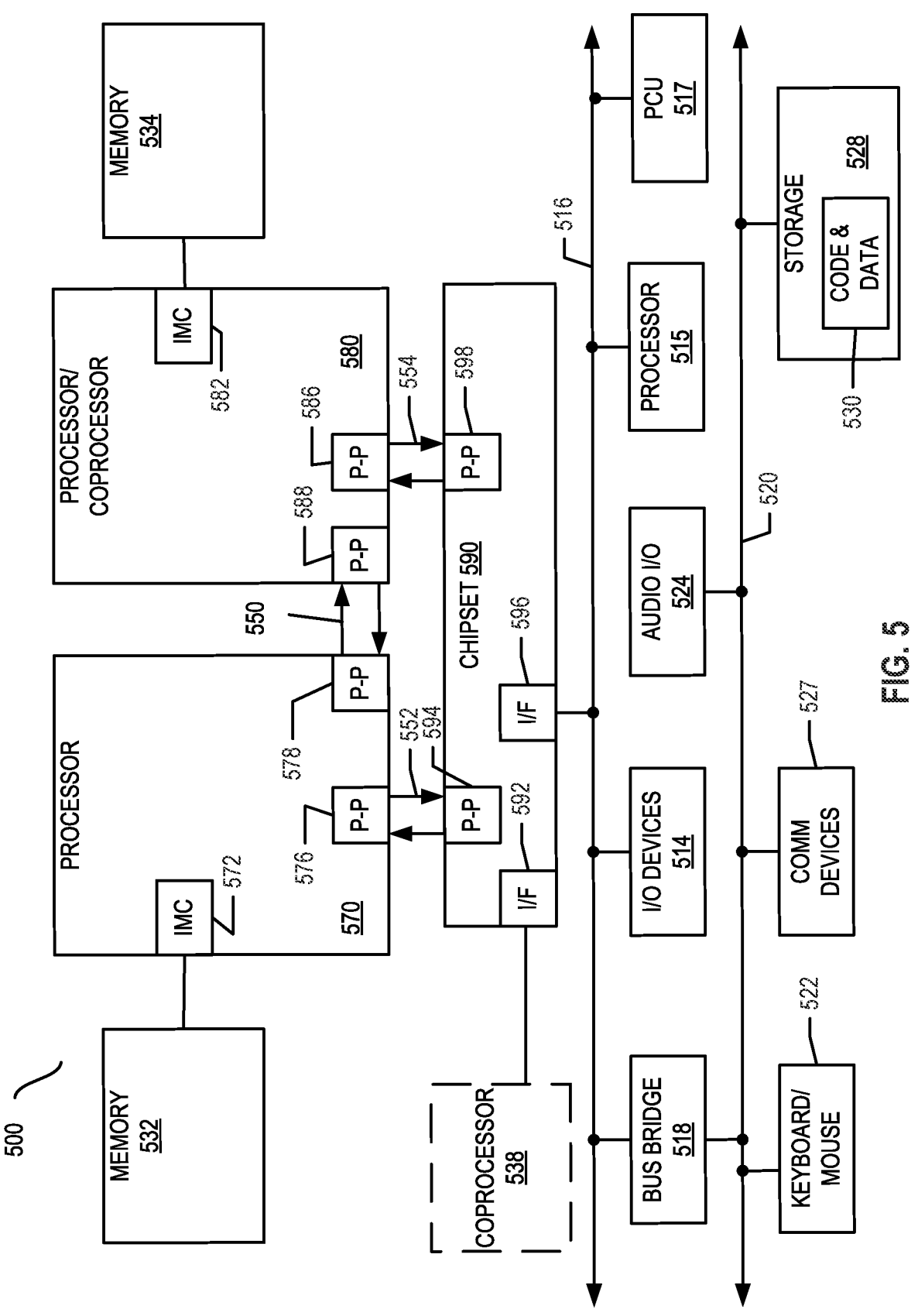
FIG. 5 illustrates embodiments of an exemplary system.

FIG. 5 illustrates embodiments of an exemplary system. Multiprocessor system 500 is a point-to-point interconnect system and includes a plurality of processors including a first processor 570 and a second processor 580 coupled via a point-to-point interconnect 550. In some embodiments, the first processor 570 and the second processor 580 are homogeneous. In some embodiments, first processor 570 and the second processor 580 are heterogenous.

Processors 570 and 580 are shown including integrated memory controller (IMC) units circuitry 572 and 582, respectively. Processor 570 also includes as part of its interconnect controller units point-to-point (P-P) interfaces 576 and 578; similarly, second processor 580 includes P-P interfaces 586 and 588. Processors 570, 580 may exchange information via the point-to-point (P-P) interconnect 550 using P-P interface circuits 578, 588. IMCs 572 and 582 couple the processors 570, 580 to respective memories, namely a memory 532 and a memory 534, which may be portions of main memory locally attached to the respective processors.

Processors 570, 580 may each exchange information with a chipset 590 via individual P-P interconnects 552, 554 using point to point interface circuits 576, 594, 586, 598. Chipset 590 may optionally exchange information with a coprocessor 538 via a high-performance interface 592. In some embodiments, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor 570, 580 or outside of both processors, yet connected with the processors via P-P interconnect, such that either or both processors' local cache information may be stored in the shared cache if a processor is placed into a low power mode.

Chipset 590 may be coupled to a first interconnect 516 via an interface 596. In some embodiments, first interconnect 516 may be a Peripheral Component Interconnect (PCI) interconnect, or an interconnect such as a PCI Express interconnect or another I/O interconnect. In some embodiments, one of the interconnects couples to a power control unit (PCU) 517, which may include circuitry, software, and/or firmware to perform power management operations with regard to the processors 570, 580 and/or co-processor

538. PCU 517 provides control information to a voltage regulator to cause the voltage regulator to generate the appropriate regulated voltage. PCU 517 also provides control information to control the operating voltage generated. In various embodiments, PCU 517 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 517 is illustrated as being present as logic separate from the processor 570 and/or processor 580. In other cases, PCU 517 may execute on a given one or more of cores (not shown) of processor 570 or 580. In some cases, PCU 517 may be implemented as a microcontroller (dedicated or general-purpose) or other control logic configured to execute its own dedicated power management code, sometimes referred to as P-code. In yet other embodiments, power management operations to be performed by PCU 517 may be implemented externally to a processor, such as by way of a separate power management integrated circuit (PMIC) or another component external to the processor. In yet other embodiments, power management operations to be performed by PCU 517 may be implemented within BIOS or other system software.

Various I/O devices 514 may be coupled to first interconnect 516, along with an interconnect (bus) bridge 518 which couples first interconnect 516 to a second interconnect 520. In some embodiments, one or more additional processor(s) 515, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 516. In some embodiments, second interconnect 520 may be a low pin count (LPC) interconnect. Various devices may be coupled to second interconnect 520 including, for example, a keyboard and/or mouse 522, communication devices 527 and a storage unit circuitry 528. Storage unit circuitry 528 may be a disk drive or other mass storage device which may include instructions/code and data 530, in some embodiments. Further, an audio I/O 524 may be coupled to second interconnect 520. Note that other architectures than the point-to-point architecture described above are possible. For example, instead of the point-to-point architecture, a system such as multiprocessor system 500 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 6:
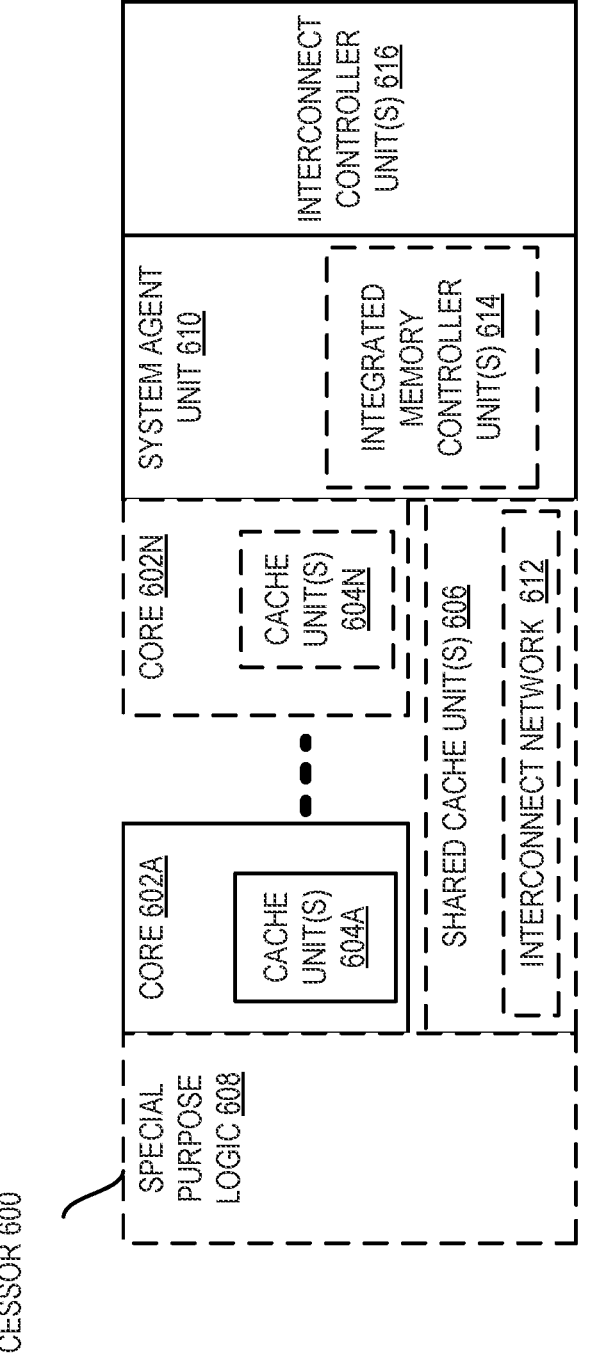
FIG. 6 illustrates a block diagram of embodiments of a processor 600 that may have more than one core, may have an integrated memory controller, and may have integrated graphics.

FIG. 6 illustrates a block diagram of embodiments of a processor 600 that may have more than one core, may have an integrated memory controller, and may have integrated graphics. The solid lined boxes illustrate a processor 600 with a single core 602A, a system agent 610, a set of one or more interconnect controller units circuitry 616, while the optional addition of the dashed lined boxes illustrates an alternative processor 600 with multiple cores 602(A)-(N), a set of one or more integrated memory controller unit(s) circuitry 614 in the system agent unit circuitry 610, and special purpose logic 608, as well as a set of one or more interconnect controller units circuitry 616. Note that the processor 600 may be one of the processors 570 or 580, or co-processor 538 or 515 of FIG. 5.

Thus, different implementations of the processor 600 may include: 1) a CPU with the special purpose logic 608 being integrated graphics and/or scientific (throughput) logic (which may include one or more cores, not shown), and the cores 602(A)-(N) being one or more general purpose cores (e.g., general purpose in-order cores, general purpose out-of-order cores, or a combination of the two); 2) a coprocessor with the cores 602(A)-(N) being a large number of special purpose cores intended primarily for graphics and/or scientific (throughput); and 3) a coprocessor with the cores 602(A)-(N) being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

A memory hierarchy includes one or more levels of cache unit(s) circuitry 604(A)-(N) within the cores 602(A)-(N), a set of one or more shared cache units circuitry 606, and external memory (not shown) coupled to the set of integrated memory controller units circuitry 614. The set of one or more shared cache units circuitry 606 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 612 interconnects the special purpose logic 608 (e.g., integrated graphics logic), the set of shared cache units circuitry 606, and the system agent unit circuitry 610, alternative embodiments use any number of well-known techniques for interconnecting such units. In some embodiments, coherency is maintained between one or more of the shared cache units circuitry 606 and cores 602(A)-(N).

In some embodiments, one or more of the cores 602(A)-(N) are capable of multi-threading. The system agent unit circuitry 610 includes those components coordinating and operating cores 602(A)-(N). The system agent unit circuitry 610 may include, for example, power control unit (PCU) circuitry and/or display unit circuitry (not shown). The PCU may be or may include logic and components needed for regulating the power state of the cores 602(A)-(N) and/or the special purpose logic 608 (e.g., integrated graphics logic). The display unit circuitry is for driving one or more externally connected displays.

The cores 602(A)-(N) may be homogenous or heterogeneous in terms of architecture instruction set; that is, two or more of the cores 602(A)-(N) may be capable of executing the same instruction set, while other cores may be capable of executing only a subset of that instruction set or a different instruction set.

Exemplary Core Architectures

In-Order and Out-of-Order Core Block Diagram

Figure 7A:
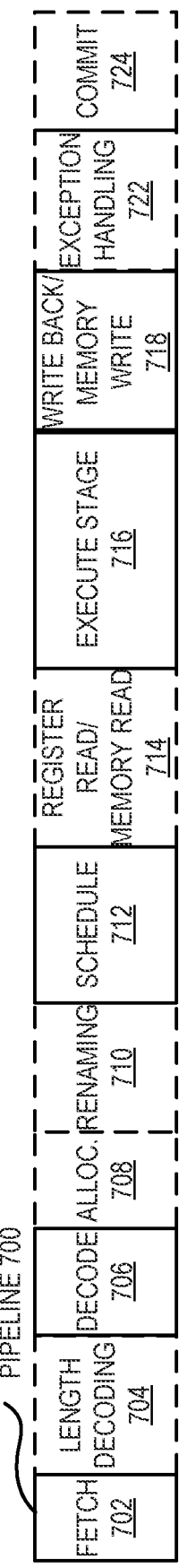
FIG. 7(A) is a block diagram illustrating both an exemplary in-order pipeline and an exemplary register renaming, out-of-order issue/execution pipeline according to embodiments of the invention.
Figure 7B:
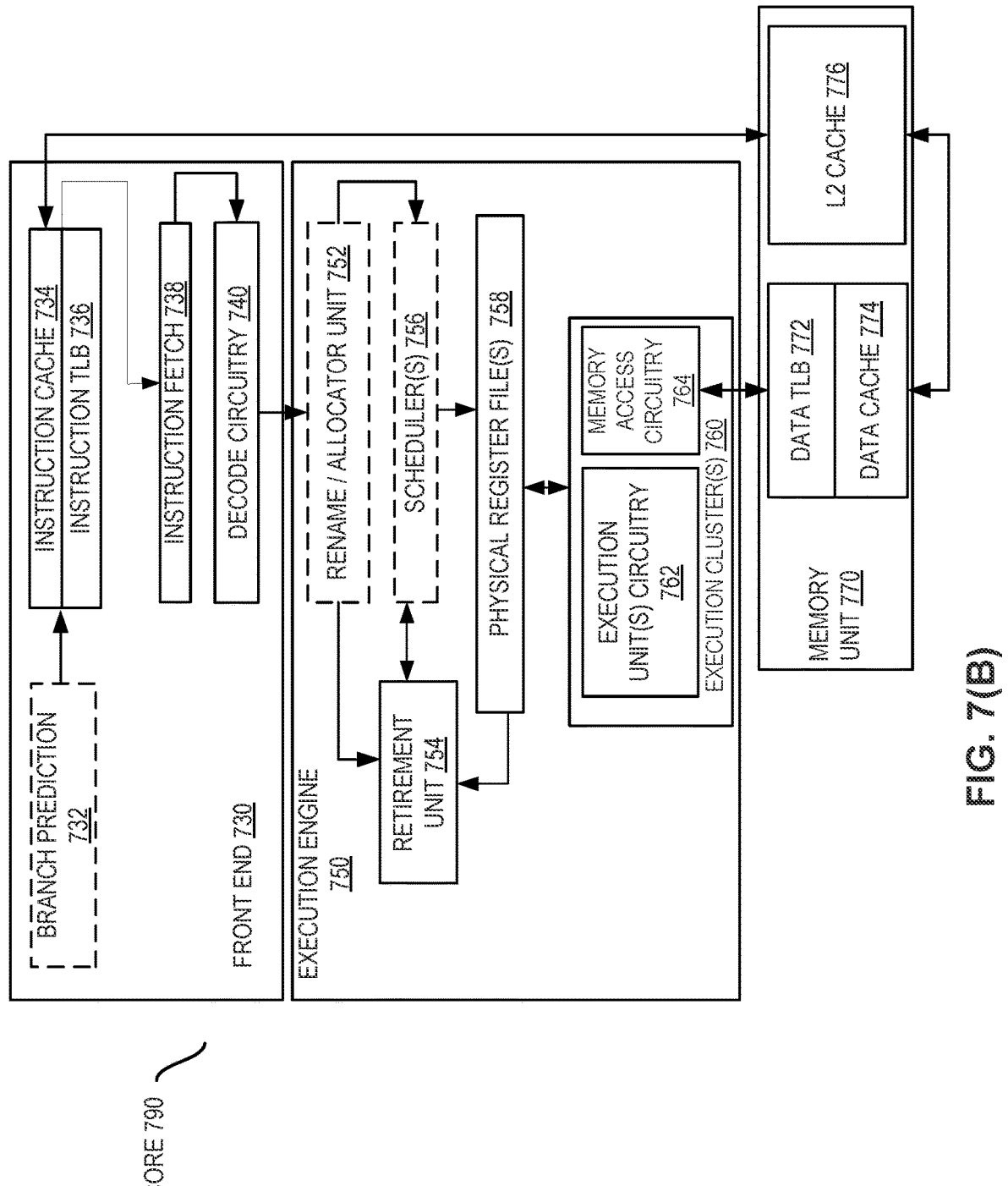
FIG. 7(B) is a block diagram illustrating both an exemplary embodiment of an in-order architecture core and an exemplary register renaming, out-of-order issue/execution architecture core to be included in a processor according to embodiments of the invention.

FIG. 7(A) is a block diagram illustrating both an exemplary in-order pipeline and an exemplary register renaming, out-of-order issue/execution pipeline according to embodiments of the invention. FIG. 7(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 7(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7(A), a processor pipeline 700 includes a fetch stage 702, an optional length decode stage 704, a decode stage 706, an optional allocation stage 708, an optional renaming stage 710, a scheduling (also known as a dispatch or issue) stage 712, an optional register read/memory read stage 714, an execute stage 716, a write back/memory write stage 718, an optional exception handling stage 722, and an optional commit stage 724. One or more operations can be performed in each of these processor pipeline stages. For example, during the fetch stage 702, one or more instructions are fetched from instruction memory, during the decode stage 706, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 706 and the register read/memory read stage 714 may be combined into one pipeline stage. In one embodiment, during the execute stage 716, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 700 as follows: 1) the instruction fetch 738 performs the fetch and length decoding stages 702 and 704; 2) the decode unit circuitry 740 performs the decode stage 706; 3) the rename/allocator unit circuitry 752 performs the allocation stage 708 and renaming stage 710; 4) the scheduler unit(s) circuitry 756 performs the schedule stage 712; 5) the physical register file(s) unit(s) circuitry 758 and the memory unit circuitry 770 perform the register read/memory read stage 714; the execution cluster 760 perform the execute stage 716; 6) the memory unit circuitry 770 and the physical register file(s) unit(s) circuitry 758 perform the write back/memory write stage 718; 7) various units (unit circuitry) may be involved in the exception handling stage 722; and 8) the retirement unit circuitry 754 and the physical register file(s) unit(s) circuitry 758 perform the commit stage 724.

FIG. 7(B) shows processor core 790 including front-end unit circuitry 730 coupled to an execution engine unit circuitry 750, and both are coupled to a memory unit circuitry 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit circuitry 730 may include branch prediction unit circuitry 732 coupled to an instruction cache unit circuitry 734, which is coupled to an instruction translation lookaside buffer (TLB) 736, which is coupled to instruction fetch unit circuitry 738, which is coupled to decode unit circuitry 740. In one embodiment, the instruction cache unit circuitry 734 is included in the memory unit circuitry 770 rather than the front-end unit circuitry 730. The decode unit circuitry 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 740 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM (not shown) or other medium that stores microcode for certain macroinstructions (e.g., in decode unit circuitry 740 or otherwise within the front-end unit circuitry 730). In one embodiment, the decode unit circuitry 740 includes a micro-operation (micro-op) or operation cache (not shown) to hold/cache decoded operations, micro-tags, or micro-operations generated during the decode or other stages of the processor pipeline 700. The decode unit circuitry 740 may be coupled to rename/allocator unit circuitry 752 in the execution engine unit circuitry 750.

The execution engine circuitry 750 includes the rename/allocator unit circuitry 752 coupled to a retirement unit circuitry 754 and a set of one or more scheduler(s) circuitry 756. The scheduler(s) circuitry 756 represents any number of different schedulers, including reservations stations, central instruction window, etc. In some embodiments, the scheduler(s) circuitry 756 can include arithmetic logic unit (ALU) scheduler/scheduling circuitry, ALU queues, arithmetic generation unit (AGU) scheduler/scheduling circuitry, AGU queues, etc. The scheduler(s) circuitry 756 is coupled to the physical register file(s) circuitry 758. Each of the physical register file(s) circuitry 758 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 758 includes vector registers unit circuitry, writemask registers unit circuitry, and scalar register unit circuitry. These register units may provide architectural vector registers, vector mask registers, general-purpose registers, etc. The physical register file(s) unit(s) circuitry 758 is overlapped by the retirement unit circuitry 754 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 754 and the physical register file(s) circuitry 758 are coupled to the execution cluster(s) 760. The execution cluster(s) 760 includes a set of one or more execution units circuitry 762 and a set of one or more memory access circuitry 764. The execution units circuitry 762 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 756, physical register file(s) unit(s) circuitry 758, and execution cluster(s) 760 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 764). It should also be understood that where separate pipelines are used, one or more of these pipelines may be out-of-order issue/execution and the rest in-order.

In some embodiments, the execution engine unit circuitry 750 may perform load store unit (LSU) address/data pipelining to an Advanced Microcontroller Bus (AHB) interface (not shown), and address phase and writeback, data phase load, store, and branches.

The set of memory access circuitry 764 is coupled to the memory unit circuitry 770, which includes data TLB unit circuitry 772 coupled to a data cache circuitry 774 coupled to a level 2 (L2) cache circuitry 776. In one exemplary embodiment, the memory access units circuitry 764 may include a load unit circuitry, a store address unit circuit, and a store data unit circuitry, each of which is coupled to the data TLB circuitry 772 in the memory unit circuitry 770. The instruction cache circuitry 734 is further coupled to a level 2 (L2) cache unit circuitry 776 in the memory unit circuitry 770. In one embodiment, the instruction cache 734 and the data cache 774 are combined into a single instruction and data cache (not shown) in L2 cache unit circuitry 776, a level 3 (L3) cache unit circuitry (not shown), and/or main memory. The L2 cache unit circuitry 776 is coupled to one or more other levels of cache and eventually to a main memory.

Figure 8:
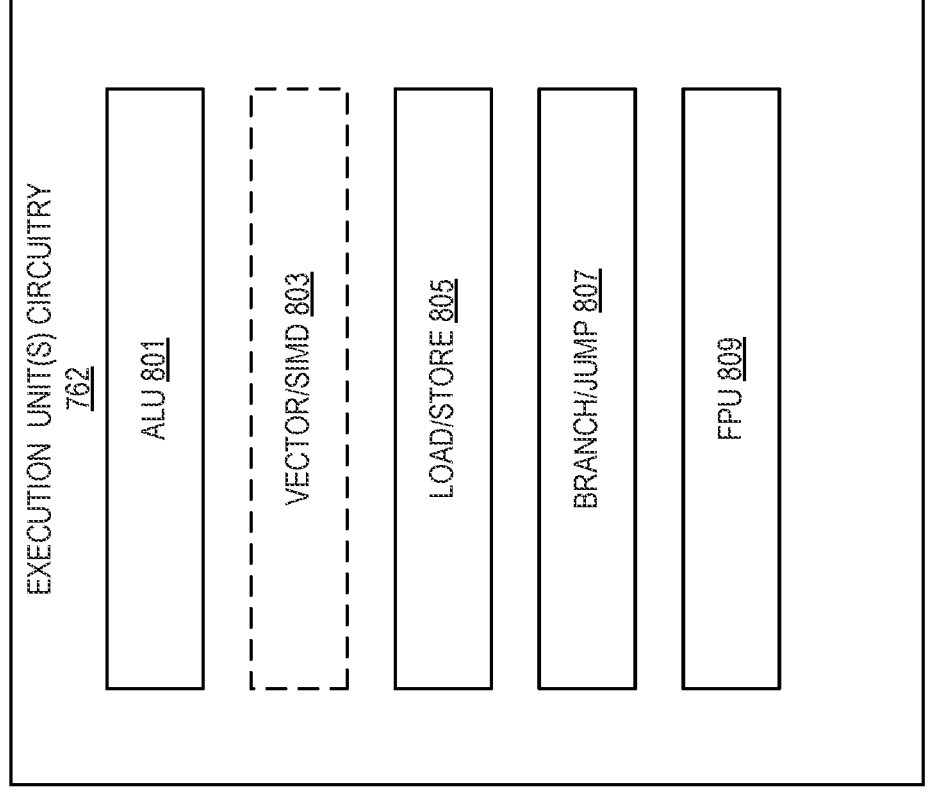
FIG. 8 illustrates embodiments of execution unit(s) circuitry, such as execution unit(s) circuitry 762 of FIG. 7(B).

The core 790 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 790 includes logic to support a packed data instruction set extension (e.g., AVX1, AVX2), thereby allowing the operations used by many multimedia applications to be performed using packed data.
Exemplary Execution Unit(s) Circuitry FIG. 8 illustrates embodiments of execution unit(s) circuitry, such as execution unit(s) circuitry 762 of FIG. 7(B). As illustrated, execution unit(s) circuitry 762 may include one or more ALU circuits 801, vector/SIMD unit circuits 803, load/store unit circuits 805, and/or branch/jump unit circuits 807. ALU circuits 801 perform integer arithmetic and/or Boolean operations. Vector/SIMD unit circuits 803 perform vector/SIMD operations on packed data (such as SIMD/vector registers). Load/store unit circuits 805 execute load and store instructions to load data from memory into registers or store from registers to memory. Load/store unit circuits 805 may also generate addresses. Branch/jump unit circuits 807 cause a branch or jump to a memory address depending on the instruction. Floating-point unit (FPU) circuits 809 perform floating-point arithmetic. The width of the execution unit(s) circuitry 762 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).
Exemplary Register Architecture FIG. 9 is a block diagram of a register architecture 900 according to some embodiments. As illustrated, there are vector/SIMD registers 910 that vary from 128-bit to 1,024 bits width. In some embodiments, the vector/SIMD registers 910 are physically 512-bits and, depending upon the mapping, only some of the lower bits are used. For example, in some embodiments, the vector/SIMD registers 910 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 900 includes writemask/predicate registers 915. For example, in some embodiments, there are 8 writemask/predicate registers (sometimes called k0 through k7) that are each 16-bit, 32-bit, 64-bit, or 128-bit in size. Writemask/predicate registers 915 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 915 corresponds to a data element position of the destination. In other embodiments, the writemask/predicate registers 915 are scalable and consists of a set number of enable bits for a given vector element (e.g., 8 enable bits per 64-bit vector element).

The register architecture 900 includes a plurality of general-purpose registers 925. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 900 includes scalar floating-point register 945 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 940 (e.g., EFLAGS, RFLAGS, etc.) store status and control information for arithmetic, compare, and system operations. For example, the one or more flag registers 940 may store condition code information such as carry, parity, auxiliary carry, zero, sign, and overflow. In some embodiments, the one or more flag registers 940 are called program status and control registers.

Segment registers 920 contain segment points for use in accessing memory. In some embodiments, these registers are referenced by the names CS, DS, SS, ES, FS, and GS.

Machine specific registers (MSRs) 935 control and report on processor performance. Most MSRs 935 handle system-related functions and are not accessible to an application program. Machine check registers 960 consist of control, status, and error reporting MSRs that are used to detect and report on hardware errors.

One or more instruction pointer register(s) 930 store an instruction pointer value. Control register(s) 955 (e.g., CR0-CR4) determine the operating mode of a processor (e.g., processor 570, 580, 538, 515, and/or 600) and the characteristics of a currently executing task. Debug registers 950 control and allow for the monitoring of a processor or core's debugging operations.

Memory management registers 965 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.
Instruction Sets An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 10:
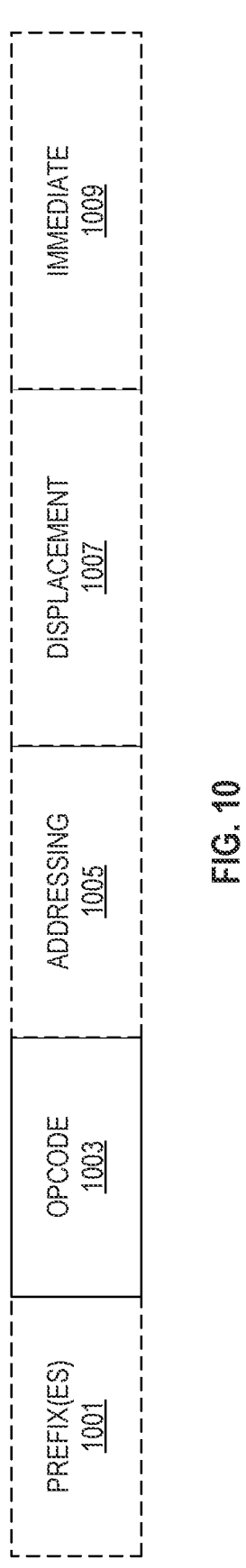
FIG. 10 illustrates embodiments of an instruction format.

FIG. 10 illustrates embodiments of an instruction format. As illustrated, an instruction may include multiple components including, but not limited to, one or more fields for: one or more prefixes 1001, an opcode 1003, addressing information 1005 (e.g., register identifiers, memory addressing information, etc.), a displacement value 1007, and/or an immediate 1009. Note that some instructions utilize some or all of the fields of the format whereas others may only use the field for the opcode 1003. In some embodiments, the order illustrated is the order in which these fields are to be encoded, however, it should be appreciated that in other embodiments these fields may be encoded in a different order, combined, etc.

The prefix(es) field(s) 1001, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1003 is used to at least partially define the operation to be performed upon a decoding of the instruction. In some embodiments, a primary opcode encoded in the opcode field 1003 is 1, 2, or 3 bytes in length. In other embodiments, a primary opcode can be a different length. An additional 3-bit opcode field is sometimes encoded in another field.

Figure 11:
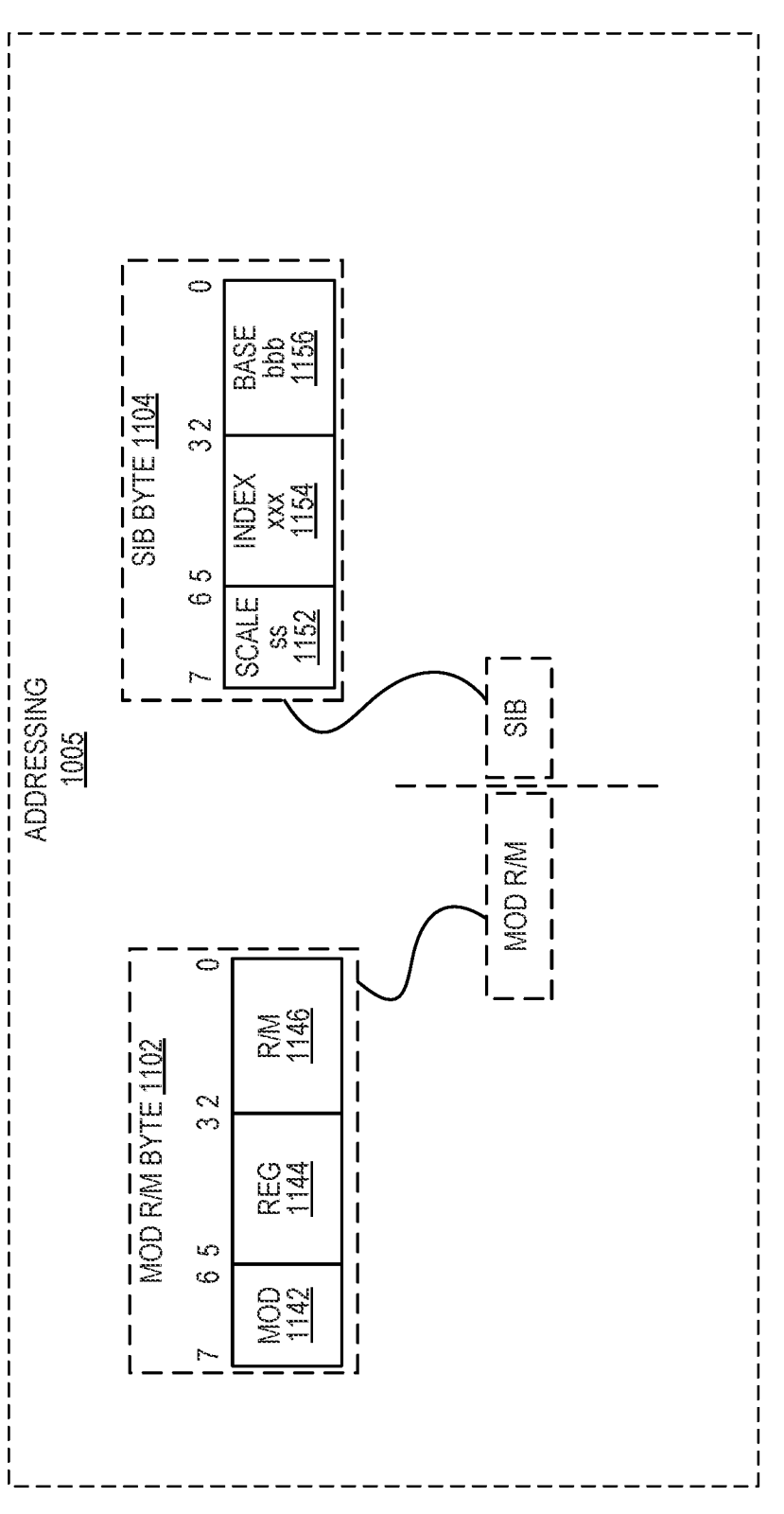
FIG. 11 illustrates embodiments of the addressing field 1005.

The addressing field 1005 is used to address one or more operands of the instruction, such as a location in memory or one or more registers. FIG. 11 illustrates embodiments of the addressing field 1005. In this illustration, an optional ModR/M byte 1102 and an optional Scale, Index, Base (SIB) byte 1104 are shown. The ModR/M byte 1102 and the SIB byte 1104 are used to encode up to two operands of an instruction, each of which is a direct register or effective memory address. Note that each of these fields are optional in that not all instructions include one or more of these fields. The MOD R/M byte 1102 includes a MOD field 1142, a register field 1144, and R/M field 1146.

The content of the MOD field 1142 distinguishes between memory access and non-memory access modes. In some embodiments, when the MOD field 1142 has a value of b11, a register-direct addressing mode is utilized, and otherwise register-indirect addressing is used.

The register field 1144 may encode either the destination register operand or a source register operand, or may encode an opcode extension and not be used to encode any instruction operand. The content of register index field 1144, directly or through address generation, specifies the locations of a source or destination operand (either in a register or in memory). In some embodiments, the register field 1144 is supplemented with an additional bit from a prefix (e.g., prefix 1001) to allow for greater addressing.

The R/M field 1146 may be used to encode an instruction operand that references a memory address, or may be used to encode either the destination register operand or a source register operand. Note the R/M field 1146 may be combined with the MOD field 1142 to dictate an addressing mode in some embodiments.

The SIB byte 1104 includes a scale field 1152, an index field 1154, and a base field 1156 to be used in the generation of an address. The scale field 1152 indicates scaling factor. The index field 1154 specifies an index register to use. In some embodiments, the index field 1154 is supplemented with an additional bit from a prefix (e.g., prefix 1001) to allow for greater addressing. The base field 1156 specifies a base register to use. In some embodiments, the base field 1156 is supplemented with an additional bit from a prefix (e.g., prefix 1001) to allow for greater addressing. In practice, the content of the scale field 1152 allows for the scaling of the content of the index field 1154 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1007 provides this value. Additionally, in some embodiments, a displacement factor usage is encoded in the MOD field of the addressing field 1005 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1007.

In some embodiments, an immediate field 1009 specifies an immediate for the instruction. An immediate may be encoded as a 1-byte value, a 2-byte value, a 4-byte value, etc.

FIG. 12 illustrates embodiments of a first prefix 1001(A). In some embodiments, the first prefix 1001(A) is an embodiment of a REX prefix. Instructions that use this prefix may specify general purpose registers, 64-bit packed data registers (e.g., single instruction, multiple data (SIM D) registers or vector registers), and/or control registers and debug registers (e.g., CR8-CR15 and DR8-DR15).

Instructions using the first prefix 1001(A) may specify up to three registers using 3-bit fields depending on the format: 1) using the reg field 1144 and the R/M field 1146 of the Mod R/M byte 1102; 2) using the Mod R/M byte 1102 with the SIB byte 1104 including using the reg field 1144 and the base field 1156 and index field 1154; or 3) using the register field of an opcode.

In the first prefix 1001(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1144 and MOD R/M R/M field 1146 alone can each only address 8 registers.

In the first prefix 1001(A), bit position 2 (R) may an extension of the MOD R/M reg field 1144 and may be used to modify the ModR/M reg field 1144 when that field encodes a general purpose register, a 64-bit packed data register (e.g., a SSE register), or a control or debug register. R is ignored when Mod R/M byte 1102 specifies other registers or defines an extended opcode.

Bit position 1 (X) X bit may modify the SIB byte index field 1154.

Bit position B (B) B may modify the base in the Mod R/M R/M field 1146 or the SIB byte base field 1156; or it may modify the opcode register field used for accessing general purpose registers (e.g., general purpose registers 925).

FIGS. 13(A)-(D) illustrate embodiments of how the R, X, and B fields of the first prefix 1001(A) are used. FIG. 13(A) illustrates R and B from the first prefix 1001(A) being used to extend the reg field 1144 and R/M field 1146 of the MOD R/M byte 1102 when the SIB byte 11 04 is not used for memory addressing. FIG. 13(B) illustrates R and B from the first prefix 1001(A) being used to extend the reg field 1144 and R/M field 1146 of the MOD R/M byte 1102 when the SIB byte 11 04 is not used (register-register addressing). FIG. 13(C) illustrates R, X, and B from the first prefix 1001(A) being used to extend the reg field 1144 of the MOD R/M byte 1102 and the index field 1154 and base field 1156 when the SIB byte 11 04 being used for memory addressing. FIG. 13(D) illustrates B from the first prefix 1001(A) being used to extend the reg field 1144 of the MOD R/M byte 1102 when a register is encoded in the opcode 1003.

Figures 14A, 14B:
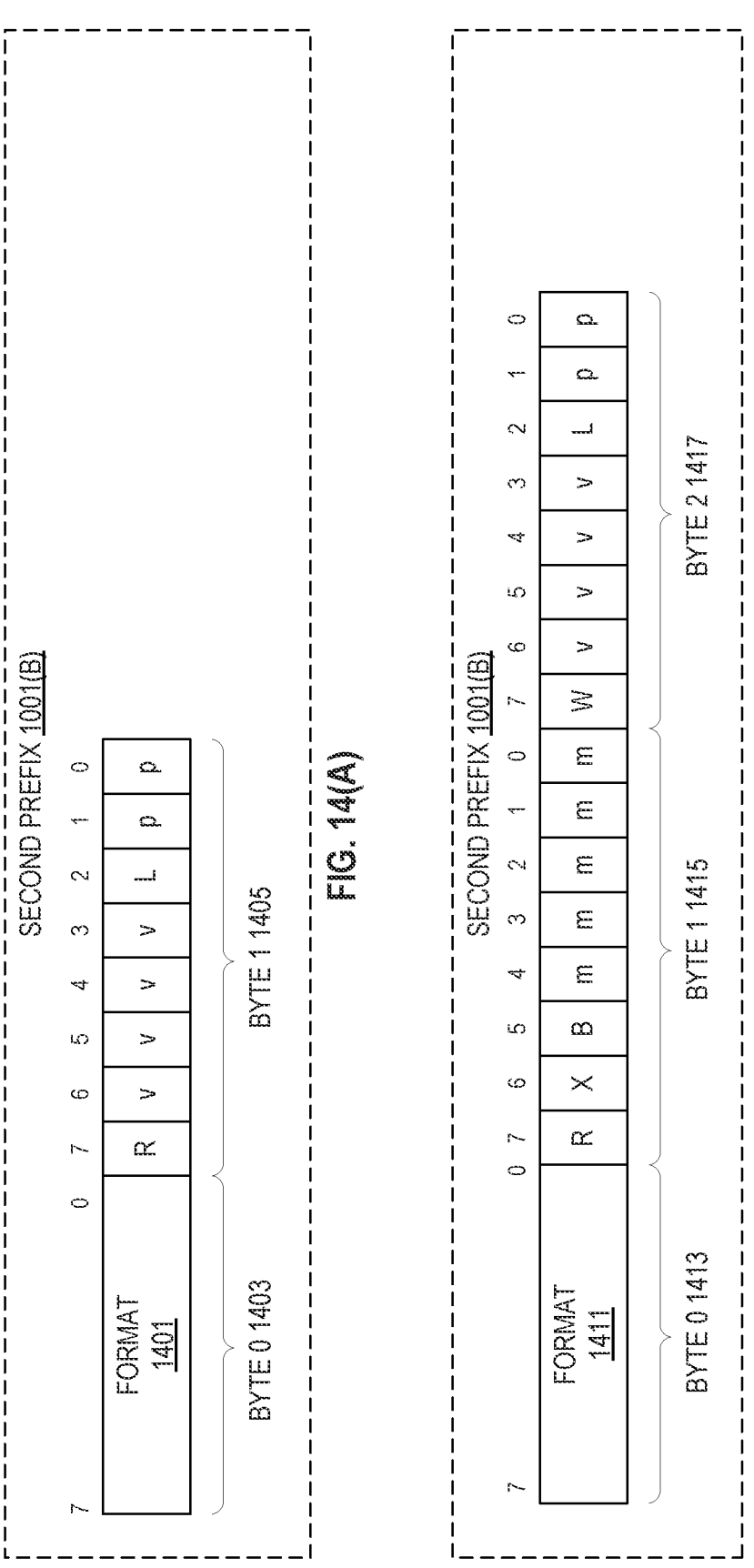
FIGS. 14(A)-(B) illustrate embodiments of a second prefix 1001(B).

FIGS. 14(A)-(B) illustrate embodiments of a second prefix 1001(B). In some embodiments, the second prefix 1001(B) is an embodiment of a VEX prefix. The second prefix 1001(B) encoding allows instructions to have more than two operands, and allows SIMD vector registers (e.g., vector/SIMD registers 910) to be longer than 64-bits (e.g., 128-bit and 256-bit). The use of the second prefix 1001(B) provides for three-operand (or more) syntax. For example, previous two-operand instructions performed operations such as A=A+B, which overwrites a source operand. The use of the second prefix 1001(B) enables operands to perform nondestructive operations such as A=B+C.

In some embodiments, the second prefix 1001(B) comes in two forms—a two-byte form and a three-byte form. The two-byte second prefix 1001(B) is used mainly for 128-bit, scalar, and some 256-bit instructions; while the three-byte second prefix 1001(B) provides a compact replacement of the first prefix 1001(A) and 3-byte opcode instructions.

FIG. 14(A) illustrates embodiments of a two-byte form of the second prefix 1001(B). In one example, a format field 1401 (byte 0 1403) contains the value C5H. In one example, byte 1 1405 includes a "R" value in bit[7]. This value is the complement of the same value of the first prefix 1001(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1146 to encode the instruction operand that references a memory address or encode either the destination register operand or a source register operand.

Instructions that use this prefix may use the Mod R/M reg field 1144 to encode either the destination register operand or a source register operand, be treated as an opcode extension and not used to encode any instruction operand.

For instruction syntax that support four operands, vvvv, the Mod R/M R/M field 1146 and the Mod R/M reg field 1144 encode three of the four operands. Bits[7:4] of the immediate 1009 are then used to encode the third source register operand.

FIG. 14(B) illustrates embodiments of a three-byte form of the second prefix 1001(B). in one example, a format field 1411 (byte 0 1413) contains the value C4H. Byte 1 1415 includes in bits[7:5] "R," "X," and "B" which are the complements of the same values of the first prefix 1001(A). Bits[4:0] of byte 1 1415 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1417 is used similar to W of the first prefix 1001(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1146 to encode the instruction operand that references a memory address or encode either the destination register operand or a source register operand.

Instructions that use this prefix may use the Mod R/M reg field 1144 to encode either the destination register operand or a source register operand, be treated as an opcode extension and not used to encode any instruction operand.

For instruction syntax that support four operands, vvvv, the Mod R/M R/M field 1146, and the Mod R/M reg field 1144 encode three of the four operands. Bits[7:4] of the immediate 1009 are then used to encode the third source register operand.

Figure 15:
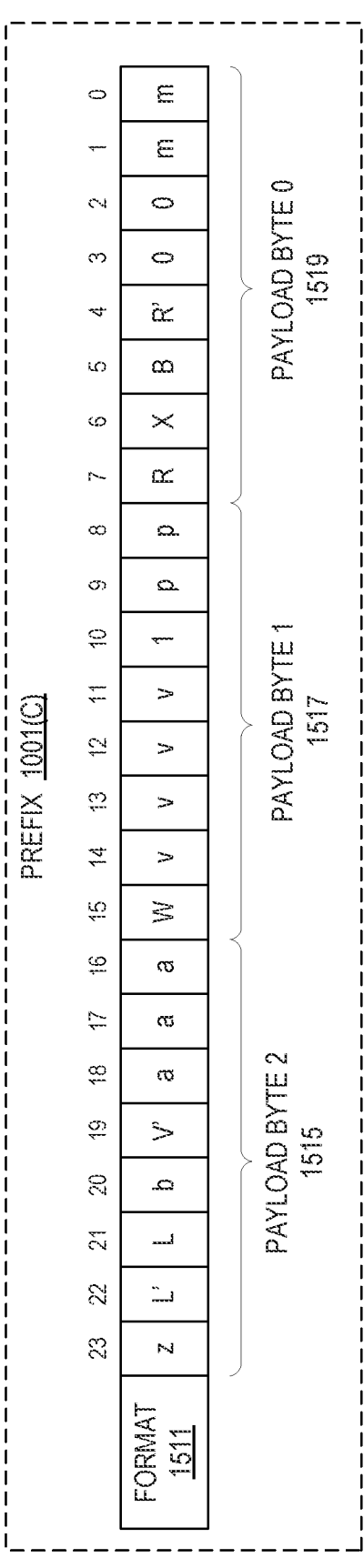
FIG. 15 illustrates embodiments of a third prefix 1001(C).

FIG. 15 illustrates embodiments of a third prefix 1001(C). In some embodiments, the first prefix 1001(A) is an embodiment of an EVEX prefix. The third prefix 1001(C) is a four-byte prefix.

The third prefix 1001(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 9) or predication utilize this prefix. Opmask register allow for conditional processing or selection control. Opmask instructions, whose source/destination operands are opmask registers and treat the content of an opmask register as a single value, are encoded using the second prefix 1001(B).

The third prefix 1001(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1001(C) is a format field 1511 that has a value, in one example, of 62H. Subsequent bytes are referred to as payload bytes 1515-1519 and collectively form a 24-bit value of P[23:0] providing specific capability in the form of one or more fields (detailed herein).

In some embodiments, P[1:0] of payload byte 1519 are identical to the low two mmmmm bits. P[3:2] are reserved in some embodiments. Bit P[4] (R') allows access to the high 16 vector register set when combined with P[7] and the ModR/M reg field 1144. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1144 and ModR/M R/M field 1146. P[9:8] provide opcode extensibility equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1001(A) and second prefix 1011(B) and may serve as an opcode extension bit or operand size promotion.

P[18:16] specify the index of a register in the opmask (writemask) registers (e.g., writemask/predicate registers 915). In one embodiment of the invention, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1001(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1] | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
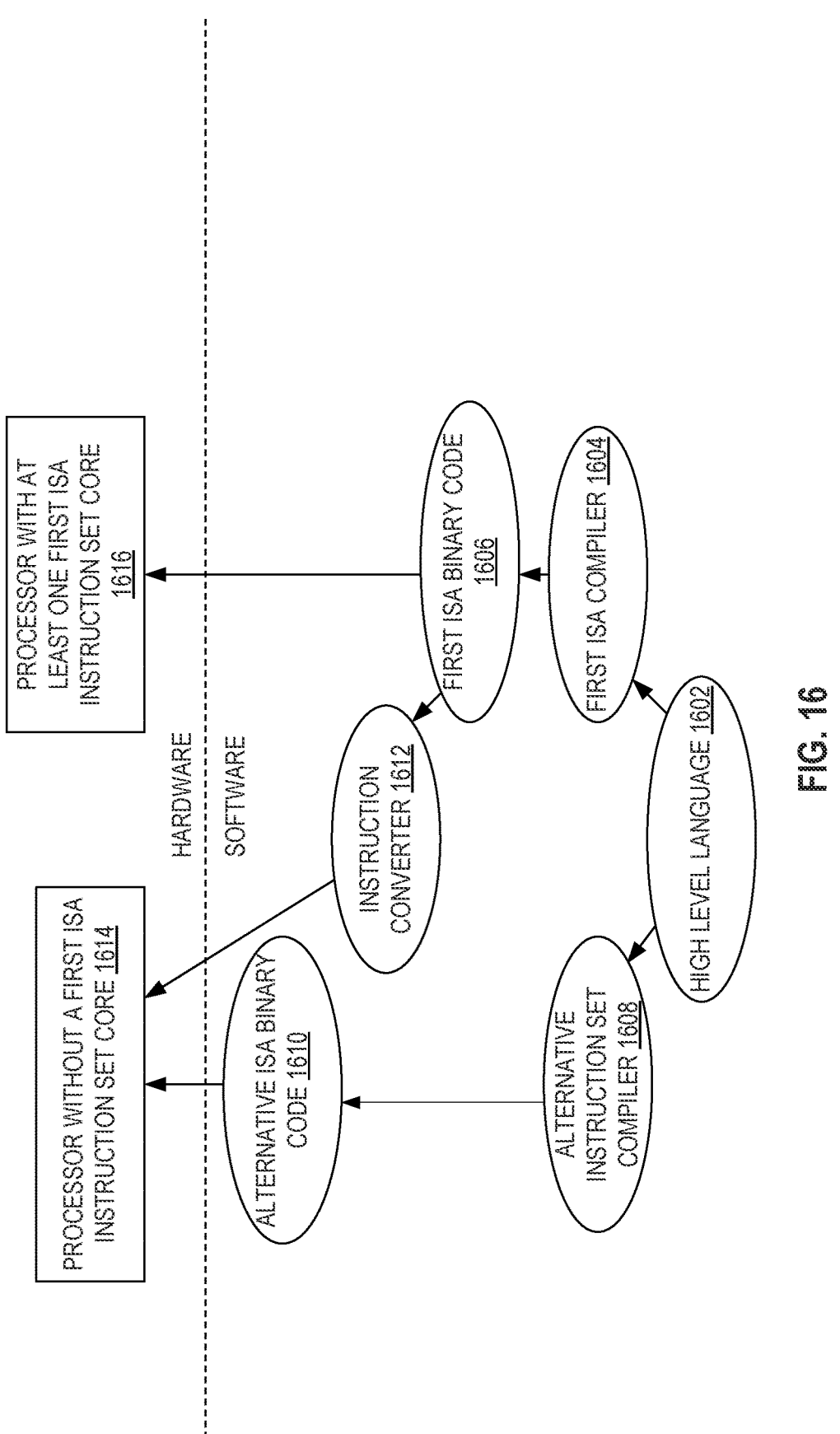
FIG. 16 illustrates a block diagram contrasting the use of a software instruction converter to convert binary instructions in a source instruction set to binary instructions in a target instruction set according to embodiments of the invention.

FIG. 16 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high-level language 1602 may be compiled using a first ISA compiler 1604 to generate first ISA binary code 1606 that may be natively executed by a processor with at least one first instruction set core 1616. The processor with at least one first ISA instruction set core 1616 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1604 represents a compiler that is operable to generate first ISA binary code 1606 (e.g., object code) that can, with or without additional linkage processing, be executed on the processor with at least one first ISA instruction set core 1616. Similarly, FIG. 16 shows the program in the high-level language 1602 may be compiled using an alternative instruction set compiler 1608 to generate alternative instruction set binary code 1610 that may be natively executed by a processor without a first ISA instruction set core 1614. The instruction converter 1612 is used to convert the first ISA binary code 1606 into code that may be natively executed by the processor without a first ISA instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have a first ISA instruction set processor or core to execute the first ISA binary code 1606.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Exemplary Embodiments

1. An apparatus comprising:
   a memory bandwidth monitor per thread local to a core, each thread's local bandwidth monitor to at least allocate bandwidth for memory requests originating from the thread according to a class of service level stored in a field of quality of service (QoS) model-specific register (MSR), the class of service level pointed to by a class of service field in a platform quality of service MSR, and execution resources to support execution of at least one thread of the core; and
   a memory bandwidth monitor per thread external to the core to monitor memory requests from the core and to provide feedback regarding bandwidth based on software allocation and bandwidth monitoring.

2. The apparatus of example 1, each field of the QoS MSR is 8-bit in size.
3. The apparatus of any of examples 1-2, wherein, upon a context switch to a second thread, the platform quality of service MSR is to be written to update the class of service field.
4. The apparatus of example 3, further comprising: a QoS MSR for the second thread.
5. The apparatus of any of examples 1-4, further comprising: a last level cache.
6. The apparatus of any of examples 1-5, further comprising: a memory bandwidth monitor per thread external to the core to monitor memory requests from the core and to provide feedback regarding bandwidth based on software allocation and bandwidth monitoring.
7. The apparatus of any of examples 1-2, wherein the memory request is to a main memory.
8. The apparatus of any of examples 1-6, wherein the bandwidth is to be adjusted in a non-linear fashion.
9. The apparatus of any of examples 1-8, wherein the bandwidth is to be adjusted in a linear fashion.
10. The apparatus of any of examples 1-9, wherein support for per thread memory bandwidth is enumerated in a CPUID leaf.
11. The apparatus of any of examples 1-10, wherein the core further comprises: a local queue to receive memory requests from a thread of the core, wherein a number of available entries in the local queue is to be configured based on the class of service value of the QoS MSR.
12. The apparatus of any of examples 1-11, wherein the core further comprises: an external queue to receive memory requests from outside of the core, wherein a number of available entries in the external queue is to be configured based on the class of service value of the QoS MSR.
13. A system comprising: a memory bandwidth monitor per thread local to a core, each thread's local bandwidth monitor to at least allocate bandwidth for memory requests originating from the thread according to a class of service level stored in a field of quality of service (QoS) model-specific register (MSR), the class of service level pointed to by a class of service field in a platform quality of service MSR, and execution resources to support execution of at least one thread of the core; and memory coupled to the core.
14. The system of example 13, each field of the QoS MSR is 8-bit in size.
15. The system of any of examples 13-14, wherein, upon a context switch to a second thread, the platform quality of service MSR is to be written to update the class of service field.
16. The system of any of examples 13-15, further comprising: a QoS MSR for the second thread.
17. The system of any of examples 13-16, wherein the core further comprises: a last level cache.
18. The system of any of examples 13-17, further comprising: a memory bandwidth monitor per thread external to the core to monitor memory requests from the core and to provide feedback regarding bandwidth based on software allocation and bandwidth monitoring.

19. The system of any of examples 13-18, wherein the bandwidth is to be adjusted in a non-linear fashion.
20. The system of any of examples 13-19, wherein the bandwidth is to be adjusted in a linear fashion.
The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:
1. An apparatus comprising: a plurality of per thread quality of service (QoS) model specific registers (MSRs), wherein each QoS MSR is associated with a single thread; a platform level MSR to index into the thread QOS MSRs; a memory bandwidth monitor per thread local to a core, each thread's local bandwidth monitor to at least allocate bandwidth for memory requests originating from the thread according to a value for a first class of service stored in a field of its associated thread QoS MSR of the plurality of thread QoS MSRs, the class of service pointed to by the platform level MSR, wherein each of the thread QoS MSRs is to store a value for a plurality of classes of service including the value for the first class of service; and execution resources to support execution of at least one thread of the core.
2. The apparatus of claim 1, wherein each field of the QOS MSR is 8-bit in size.
3. The apparatus of claim 1, wherein, upon a context switch to a second thread from a first thread, the platform quality of service MSR is to be written to update the class of service field.
4. The apparatus of claim 3, wherein the second thread is associated with a QoS MSR.
5. The apparatus of claim 1, further comprising: a last level cache and wherein the memory request is to the last level cache.
6. The apparatus of claim 1, further comprising: a memory bandwidth monitor per thread external to the core to monitor memory requests from the core and to provide feedback regarding bandwidth based on software allocation and bandwidth monitoring.
7. The apparatus of claim 1, wherein the memory request is to a main memory.
8. The apparatus of claim 1, wherein the bandwidth is to be adjusted in a non-linear fashion.
9. The apparatus of claim 1, wherein the bandwidth is to be adjusted in a linear fashion.
10. The apparatus of claim 1, wherein support for per thread memory bandwidth is enumerated in a CPUID leaf.
11. The apparatus of claim 1, wherein the core further comprises: a local queue to receive memory requests from a thread of the core, wherein a number of available entries in the local queue is to be configured based on the class of service value of the QOS MSR.
12. The apparatus of claim 1, wherein the core further comprises: an external queue to receive memory requests from outside of the core, wherein a number of available entries in the external queue is to be configured based on the class of service value of the QOS MSR.

13. A system comprising:

a core including:

a plurality of per thread quality of service (QOS) model specific registers (MSRs), wherein each QoS MSR is associated with a single thread;

a platform level MSR to index into the thread QOS MSRs;

a memory bandwidth monitor per thread local to a core, each thread's local bandwidth monitor to at least allocate bandwidth for memory requests originating from the thread according to a value for a first class of service stored in a field of its associated thread QoS MSR of the plurality of thread QoS MSRs, the class of service pointed to by the platform level MSR, wherein each of the thread QoS MSRs is to store a value for a plurality of classes of service including the value for the first class of service, and execution resources to support execution of at least one thread of the core; and memory coupled to the core.

14. The system of claim 13, wherein each field of the QOS MSR is 8-bit in size.

15. The system of claim 13, wherein, upon a context switch to a second thread, the platform quality of service MSR is to be written to update the class of service field.

16. The system of claim 15, further comprising:

a QOS MSR for the second thread.

17. The system of claim 13, wherein the core further comprises:

a last level cache and the request to the last level cache.

18. The system of claim 13, further comprising:

a memory bandwidth monitor per thread external to the core to monitor memory requests from the core and to provide feedback regarding bandwidth based on software allocation and bandwidth monitoring.

19. The system of claim 13, wherein the bandwidth is to be adjusted in a non- linear fashion.

20. The system of claim 13, wherein the bandwidth is to be adjusted in a linear fashion.

\* \* \* \* \*